(12) United States Patent
Frascati et al.

(10) Patent No.: US 9,530,245 B2
(45) Date of Patent: Dec. 27, 2016

(54) PACKING MULTIPLE SHADER PROGRAMS ONTO A GRAPHICS PROCESSOR

(71) Applicant: QUALCOMM Incorporated, San Diego, CA (US)

(72) Inventors: Christopher Paul Frascati, Oviedo, FL (US); Avinash Seetharamaiah, Chuluota, FL (US); Joseph Blankenship, Pickens, SC (US)

(73) Assignee: QUALCOMM Incorporated, San Diego, CA (US)

( * ) Notice: Subject to any disclaimer, the term of this patent is extended or adjusted under 35 U.S.C. 154(b) by 518 days.

(21) Appl. No.: 13/708,118

(22) Filed: Dec. 7, 2012

(65) Prior Publication Data

US 2013/0169642 A1    Jul. 4, 2013

Related U.S. Application Data

(60) Provisional application No. 61/581,525, filed on Dec. 29, 2011.

(51) Int. Cl.
| | |
|---|---|
| *G06T 15/80* | (2011.01) |
| *G06T 17/20* | (2006.01) |
| *G06T 11/00* | (2006.01) |
| *G06T 1/60* | (2006.01) |
| *G06T 15/83* | (2011.01) |

(Continued)

(52) U.S. Cl.
CPC ............... *G06T 15/80* (2013.01); *G06F 9/445* (2013.01); *G06F 9/44594* (2013.01); *G06T 1/20* (2013.01); *G06T 1/60* (2013.01); *G06T 7/40* (2013.01); *G06T 11/00* (2013.01); *G06T 15/04* (2013.01); *G06T 15/83* (2013.01); *G06T 17/10* (2013.01); *G06T 17/20* (2013.01)

(58) Field of Classification Search
CPC .......... G06T 15/80; G06T 15/005; G06T 1/60; G06T 1/20; G06T 2200/28; G06T 15/04; G06T 17/10; G06T 7/40; G06T 11/00; G06T 15/83; G06T 17/20
USPC ........ 345/426, 522; 711/130, 100, 135, 129, 711/133, 143, 159, 132; 718/1, 100
See application file for complete search history.

(56) References Cited

U.S. PATENT DOCUMENTS 6,012,065 A   *  1/2000  Boucher et al.
6,359,619 B1  *  3/2002  Waters et al. ................. 345/426
(Continued)

OTHER PUBLICATIONS

Wikipedia, Cache algorithms, Dec. 11, 2010, http://en.wikipedia.org/w/index.php?title=Cache_algorithms&oldid=401721914, pp. 1-5.*

(Continued)

*Primary Examiner* — Barry Drennan
*Assistant Examiner* — Robert Craddock
(74) *Attorney, Agent, or Firm* — Shumaker & Sieffert, P.A.

(57) ABSTRACT

This disclosure describes techniques for packing multiple shader programs of a common shader program type onto a graphics processing unit (GPU). The techniques may include, for example, causing a plurality of shader programs of a common shader program type to be loaded into an on-chip shader program instruction memory of a graphics processor such that each shader program in the plurality of shader programs resides in the on-chip shader program instruction memory at a common point in time. In addition, various techniques for evicting shader programs from an on-chip shader program instruction memory are described.

42 Claims, 9 Drawing Sheets

(51) Int. Cl.
*G06T 17/10* (2006.01)
*G06T 1/20* (2006.01)
*G06T 7/40* (2006.01)
*G06T 15/04* (2011.01)
*G06F 9/445* (2006.01)

(56) References Cited

U.S. PATENT DOCUMENTS

| | | | |
|---|---|---|---|
| 7,533,237 B1* | 5/2009 | Nordquist | G06F 12/0284 711/100 |
| 7,711,902 B2* | 5/2010 | Pong | 711/133 |
| 7,750,913 B1 | 7/2010 | Parenteau et al. | |
| 8,411,096 B1* | 4/2013 | Mahan et al. | 345/522 |
| 8,698,819 B1* | 4/2014 | Mahan | G06T 1/20 345/506 |
| 2007/0091089 A1 | 4/2007 | Jiao et al. | |
| 2008/0074430 A1* | 3/2008 | Jiao | G06T 15/005 345/506 |
| 2009/0251476 A1* | 10/2009 | Jiao et al. | 345/543 |
| 2010/0026700 A1 | 2/2010 | Michail et al. | |
| 2011/0050716 A1 | 3/2011 | Mantor et al. | |
| 2011/0063313 A1 | 3/2011 | Bolz et al. | |
| 2011/0167221 A1* | 7/2011 | Pangal et al. | 711/117 |
| 2011/0219204 A1 | 9/2011 | Caspole | |
| 2012/0069033 A1* | 3/2012 | Jiao et al. | 345/522 |
| 2012/0137075 A1* | 5/2012 | Vorbach | 711/122 |
| 2013/0145001 A1* | 6/2013 | Qian et al. | 709/223 |
| 2014/0043333 A1* | 2/2014 | Narayanan | G06F 1/324 345/426 |
| 2014/0098117 A1* | 4/2014 | Goel et al. | 345/522 |

OTHER PUBLICATIONS

International Search Report and Written Opinion—PCT/US2012/068791—ISA/EPO—Mar. 20, 2013, 9 pp.
Response to Written Opinion dated Mar. 20, 2013, from International Application No. PCT/US2012/068791, filed on Oct. 29, 2013, 10 pp.
Second Written Opinion from International Application No. PCT/US2012/068791, dated Feb. 7, 2014, 6 pp.
Response to Second Written Opinion dated Feb. 7, 2014, from International Application No. PCT/US2012/068791, filed on Apr. 4, 2014, 10 pp.
International Preliminary Report on Patentability from International Application No. PCT/US2012/068791, dated May 2, 2014, 8 pp.

* cited by examiner

PACKING MULTIPLE SHADER PROGRAMS ONTO A GRAPHICS PROCESSOR

This application claims the benefit of U.S. Provisional Application No. 61/581,525, filed Dec. 29, 2011, the entire content of which is incorporated herein by reference.

TECHNICAL FIELD

This disclosure relates to graphics processing systems, and more particularly, to graphics processing systems that utilize programmable shader units.

BACKGROUND

Computing devices often utilize a graphics processing unit (GPU) to accelerate the rendering of graphics data for display. Such computing devices may include, e.g., computer workstations, mobile phones, embedded systems, personal computers and video game consoles. GPUs typically execute a graphics processing pipeline that includes a plurality of processing stages which operate together to execute graphics processing commands. Traditionally, GPUs included a fixed function graphics processing pipeline where each processing stage in the pipeline was implemented with fixed function hardware (e.g., hardware that is hard-wired to perform a certain set of specialized functions and not capable of executing a user-downloadable program). More recently, however, graphics processing pipelines have shifted to a programmable architecture where one or more processing stages in the pipeline are programmable processing stages and implemented with one or more programmable shader units. Each of the programmable shader units may be configured to execute a shader program. A user application may specify the shader program to be executed by the programmable processing stages in a programmable graphics pipeline, thereby providing a high degree of flexibility in the use of modern day GPUs.

SUMMARY

This disclosure is directed to techniques for packing multiple shader programs of a common shader program type into a shader program instruction memory of a graphics processing unit (GPU). The techniques of this disclosure may be implemented by a processing system that includes a GPU. In some examples, the techniques of this disclosure may be implemented as part of a GPU device driver software program that executes on a host central processing unit (CPU) for the GPU.

In one example, this disclosure describes a method that includes causing a plurality of shader programs of a common shader program type to be loaded into an on-chip shader program instruction memory of a graphics processor such that each shader program in the plurality of shader programs resides in the on-chip shader program instruction memory at a common point in time.

In another example, this disclosure describes a device that includes a processor configured to cause a plurality of shader programs of a common shader program type to be loaded into an on-chip shader program instruction memory of a graphics processor such that each shader program in the plurality of shader programs resides in the on-chip shader program instruction memory at a common point in time.

In another example, this disclosure describes an apparatus that includes means for loading a shader program into an on-chip shader program instruction memory of a graphics processor. The apparatus further includes means for causing a plurality of shader programs of a common shader program type to be loaded into the on-chip shader program instruction memory of the graphics processor such that each shader program in the plurality of shader programs resides in the on-chip shader program instruction memory at a common point in time.

In another example, this disclosure describes a computer-readable storage medium storing instructions that, when executed, cause one or more processors to cause a plurality of shader programs of a common shader program type to be loaded into an on-chip shader program instruction memory of a graphics processor such that each shader program in the plurality of shader programs resides in the on-chip shader program instruction memory at a common point in time.

The details of one or more examples of the disclosure are set forth in the accompanying drawings and the description below. Other features, objects, and advantages of the disclosure will be apparent from the description and drawings, and from the claims.

DETAILED DESCRIPTION

This disclosure is directed to techniques for packing multiple shader programs of a common shader program type into a shader program instruction memory of a graphics processing unit (GPU). The techniques of this disclosure may be implemented by a central processing unit (CPU) and/or a GPU. In some examples, the techniques of this disclosure may be implemented as part of a GPU device driver software program (hereinafter referred to as a "GPU driver") that executes on a host CPU for the GPU.

In a typical graphics processing system, when a GPU driver loads a shader program of a particular type (e.g., a vertex shader type, a pixel shader type, etc.) into a shader program instruction memory of the GPU, the GPU driver overwrites the other shader programs of that same type that have been previously loaded into the memory. Thus, in such systems, only a single shader program of a particular type can reside in the shader program instruction memory at a given time. If a user application and/or driver decides to execute a different shader program of the same type in such systems, then the GPU driver loads the new shader program into the shader program instruction memory and overwrites the previously-loaded shader program.

In some use cases, it is desirable to switch the GPU rendering state and the shader program multiple times when rendering an image. For example, certain types of applications may interleave Bit Block [Image] Transfer (BLIT) operations with rendering operations to display a graphical user interface (GUI). The BLIT operations may use a shader program of a particular type that is different than the shader program used for the rendering operations. Reloading shader programs in such use cases can constitute a non-negligible portion of the rendering time. However, by loading multiple shader programs of the same type into the shader program instruction memory of the GPU according to the techniques of this disclosure, the GPU may seamlessly switch between performing BLIT operations and rendering operations without needing to reload particular shader programs. In this manner, the techniques of this disclosure may be used to improve the performance of a graphics processing system.

Figure 1:
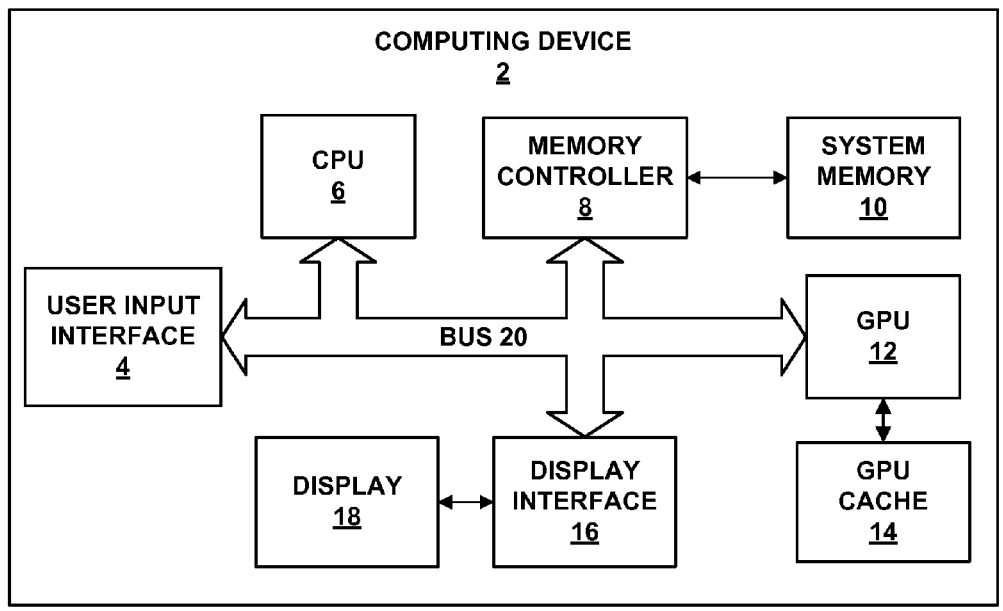
FIG. 1 is a block diagram illustrating an example computing device that may be used to implement the shader program packing techniques of this disclosure.

FIG. 1 is a block diagram illustrating an example computing device 2 that may be used to implement the shader program packing techniques of this disclosure. Computing device 2 may comprise a personal computer, a desktop computer, a laptop computer, a computer workstation, a video game platform or console, a wireless communication device (such as, e.g., a mobile telephone, a cellular telephone, a satellite telephone, and/or a mobile telephone handset), a landline telephone, an Internet telephone, a handheld device such as a portable video game device or a personal digital assistant (PDA), a personal music player, a video player, a display device, a television, a television set-top box, a server, an intermediate network device, a mainframe computer or any other type of device that processes and/or displays graphical data.

As illustrated in the example of FIG. 1, computing device 2 includes a user input interface 4, a CPU 6, a memory controller 8, a system memory 10, a graphics processing unit (GPU) 12, a GPU cache 14, a display interface 16, a display 18 and bus 20. User input interface 4, CPU 6, memory controller 8, GPU 12 and display interface 16 may communicate with each other using bus 20. Bus 20 may be any of a variety of bus structures, such as a third generation bus (e.g., a HyperTransport bus or an InfiniBand bus), a second generation bus (e.g., an Advanced Graphics Port bus, a Peripheral Component Interconnect (PCI) Express bus, or an Advanced eXentisible Interface (AXI) bus) or another type of bus or device interconnect. It should be noted that the specific configuration of buses and communication interfaces between the different components shown in FIG. 1 is merely exemplary, and other configurations of computing devices and/or other graphics processing systems with the same or different components may be used to implement the techniques of this disclosure.

CPU 6 may comprise a general-purpose or a special-purpose processor that controls operation of computing device 2. A user may provide input to computing device 2 to cause CPU 6 to execute one or more software applications. The software applications that execute on CPU 6 may include an operating system, a word processor application, an email application, a spread sheet application, a media player application, a video game application, a graphical user interface application or another program. The user may provide input to computing device 2 via one or more input devices (not shown) such as a keyboard, a mouse, a microphone, a touch pad or another input device that is coupled to computing device 2 via user input interface 4.

The software applications that execute on CPU 6 may include one or more graphics rendering instructions that instruct CPU 6 to cause the rendering of graphics data to display 18. In some examples, the software instructions may conform to a graphics application programming interface (API), such as, e.g., an Open Graphics Library (OpenGL®) API, an Open Graphics Library Embedded Systems (OpenGL ES) API, a Direct3D API, an X3D API, a DirectX API, a RenderMan API, a WebGL API, or any other public or proprietary standard graphics API. In order to process the graphics rendering instructions, CPU 6 may issue one or more graphics rendering commands to GPU 12 to cause GPU 12 to perform some or all of the rendering of the graphics data. In some examples, the graphics data to be rendered may include a list of graphics primitives, e.g., points, lines, triangles, quadralaterals, triangle strips, etc.

Memory controller 8 facilitates the transfer of data going into and out of system memory 10. For example, memory controller 8 may receive memory read and write commands, and service such commands with respect to memory system 10 in order to provide memory services for the components in computing device 2. Memory controller 8 is communicatively coupled to system memory 10. Although memory controller 8 is illustrated in the example computing device 2 of FIG. 1 as being a processing module that is separate from both CPU 6 and system memory 10, in other examples, some or all of the functionality of memory controller 8 may be implemented on one or both of CPU 6 and system memory 10.

System memory 10 may store program modules and/or instructions that are accessible for execution by CPU 6 and/or data for use by the programs executing on CPU 6. For example, system memory 10 may store user applications and graphics data associated with the applications. System memory 10 may additionally store information for use by and/or generated by other components of computing device 2. For example, system memory 10 may act as a device memory for GPU 12 and may store data to be operated on by GPU 12 as well as data resulting from operations performed by GPU 12. For example, system memory 10 may store any combination of texture buffers, depth buffers, stencil buffers, vertex buffers, frame buffers, or the like. System memory 10 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), Flash memory, a magnetic data media or an optical storage media.

GPU 12 may be configured to perform graphics operations to render one or more graphics primitives to display 18. Thus, when one of the software applications executing on CPU 6 requires graphics processing, CPU 6 may provide graphics commands and graphics data to GPU 12 for rendering to display 18. The graphics data may include, e.g., drawing commands, state information, primitive information, texture information, etc. GPU 12 may, in some instances, be built with a highly-parallel structure that provides more efficient processing of complex graphic-related operations than CPU 6. For example, GPU 12 may include a plurality of processing elements that are configured to operate on multiple vertices or pixels in a parallel manner. The highly parallel nature of GPU 12 may, in some instances, allow GPU 12 to draw graphics images (e.g., GUIs and two-dimensional (2D) and/or three-dimensional (3D) graphics scenes) onto display 18 more quickly than drawing the scenes directly to display 18 using CPU 6.

GPU 12 may, in some instances, be integrated into a motherboard of computing device 2. In other instances, GPU 12 may be present on a graphics card that is installed in a port in the motherboard of computing device 2 or may be otherwise incorporated within a peripheral device configured to interoperate with computing device 2. GPU 12 may include one or more processors, such as one or more microprocessors, application specific integrated circuits (ASICs), field programmable gate arrays (FPGAs), digital signal processors (DSPs), or other equivalent integrated or discrete logic circuitry.

GPU 12 may be directly coupled to GPU cache 14. Thus, GPU 12 may read data from and write data to GPU cache 14 without necessarily using bus 20. In other words, GPU 12 may process data locally using a local storage, instead of off-chip memory. This allows GPU 12 to operate in a more efficient manner by eliminating the need of GPU 12 to read and write data via bus 20, which may experience heavy bus traffic. In some instances, however, GPU 12 may not include a separate cache, but instead utilize system memory 10 via bus 20. GPU cache 14 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media.

CPU 6 and/or GPU 12 may store rendered image data in a frame buffer that is allocated within system memory 10. Display interface 16 may retrieve the data from the frame buffer and configure display 18 to display the image represented by the rendered image data. In some examples, display interface 16 may include a digital-to-analog converter (DAC) that is configured to convert the digital values retrieved from the frame buffer into an analog signal consumable by display 18. In other examples, display interface 16 may pass the digital values directly to display 18 for processing. Display 18 may include a monitor, a television, a projection device, a liquid crystal display (LCD), a plasma display panel, a light emitting diode (LED) array, a cathode ray tube (CRT) display, electronic paper, a surface-conduction electron-emitted display (SED), a laser television display, a nanocrystal display or another type of display unit. Display 18 may be integrated within computing device 2. For instance, display 18 may be a screen of a mobile telephone handset. Alternatively, display 18 may be a stand-alone device coupled to computer device 2 via a wired or wireless communications link. For instance, display 18 may be a computer monitor or flat panel display connected to a personal computer via a cable or wireless link.

CPU 6 may load shader programs onto GPU 12 according to the shader program packing techniques described in this disclosure. For example, CPU 6 may cause a plurality of shader programs of a common shader program type to be loaded into a shader program instruction memory of GPU 12 such that each shader program in the plurality of shader programs resides in the shader program instruction memory at a common point in time. As another example, CPU 6 may perform any of the shader program eviction techniques described in further detail later in this disclosure. Although the shader program packing techniques of this disclosure are described herein as being performed by CPU 6, in other examples, the shader program packing techniques may be performed by another component in computing device 2, such as, e.g., GPU 12.

Figure 2:
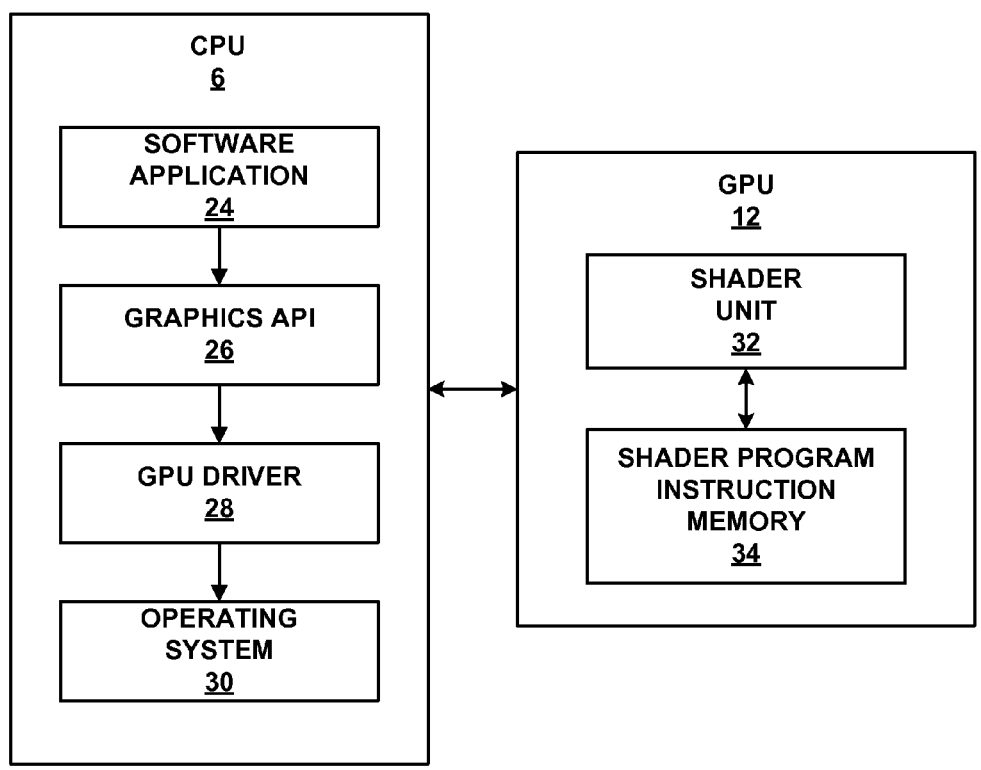
FIG. 2 is a block diagram illustrating an example CPU and an example GPU that may be used in the computing device of FIG. 1 in accordance with this disclosure.

FIG. 2 is a block diagram illustrating an example CPU 6 and an example GPU 12 that may be used in the computing device 2 of FIG. 1 in accordance with this disclosure. As shown in FIG. 2, CPU 6 is communicatively coupled to GPU 12. CPU 6 is configured to execute a software application 24, a graphics API 26, a GPU driver 28 and an operating system 30. GPU 12 includes a shader unit 32 and a shader program instruction memory 34.

Software application 24 may include one or more instructions that cause graphics images to be displayed. In some examples, the instructions may include a load shader program instruction that instructs GPU driver 28 to load a shader program onto GPU 12. The shader program, in some examples, may be a compiled version of a program written in a high-level shading language, such as, e.g., an OpenGL Shading Language (GLSL), a High Level Shading Language (HLSL), a C for Graphics (Cg) shading language, etc. The compiled version of the shader program may be alternatively referred to as a shader binary. The shader program may, in some examples, be a machine code shader program that is configured to be executed by shader unit 32 without further compilation, preparation, modification and/or assembly.

Software application 24 may issue the instructions to graphics API 26. Graphics API 26 may be a runtime service that translates the instructions received from software application 24 into a format that is consumable by GPU driver 28. GPU driver 28 receives instructions from software application 24, via graphics API 26, and controls the operation of GPU 12 to service the instructions. For example, in response to receiving a load shader program instruction from software application 24, GPU driver 28 may issue one or more commands to GPU 12 that cause the shader program specified in the instruction to be loaded onto GPU 12, e.g., loaded into shader program instruction memory 34. Graphics driver 26 may issue the commands to GPU 12 via operating system 30, e.g., via one or more system calls. Although CPU 6 is illustrated in the example system of FIG. 2 as executing a software application 24, a graphics API 26, a GPU driver 28 and an operating system 30, in other examples, CPU 6 may implement the techniques of this disclosure by executing more or less software modules that are the same or different and are organized in the same or a different configuration.

Shader unit 32 may include one or more processing elements that are configured to execute one or more types of shader programs. The different types of shader programs may include, e.g., vertex shader programs, pixel shader programs, geometry shader programs, hull shader programs, domain shader programs, compute shader programs, etc. In some examples, shader unit 32 may be configured to execute a single type of shader program. In such examples, shader unit 32 may be referred to by the type of shader program which shader unit 32 is configured to execute. For example, shader unit 32 may be referred to as a vertex shader unit if shader unit 32 is configured to execute vertex shader programs. Similarly, shader unit 32 may be referred to as a pixel shader unit, a geometry shader unit, a hull shader unit, a domain shader unit, or a compute shader unit depending upon which type of shader program shader unit 32 is configured to execute.

In further examples, shader unit 32 may be a shader subsystem that includes multiple shader units, individual ones of which may be configured to execute different types of shader programs. For example, shader unit 32 may include a vertex shader unit that is configured to execute vertex shader programs, and a pixel shader unit that is configured to execute pixel shader programs. In additional examples, shader unit 32 may be a unified shader unit that is configured to execute multiple different types of shader programs, e.g., vertex shader programs and pixel shader programs.

Shader program instruction memory 34 may store one or more shader programs that are executable by shader unit 32. A shader program may include a set of instructions that are configured to control shader unit 32 to perform one or more shader operations. A vertex shader program may control the execution of a vertex shader unit or a unified shader unit, and include instructions that specify one or more per-vertex operations. A pixel shader program may control the execution of a pixel shader unit or a unified shader unit, and include instructions that specify one or more per-pixel operations.

In some examples, shader program instruction memory 34 may be an on-chip memory. For example, GPU 12 may be formed on, located on, and/or disposed on a microchip, an integrated circuit, and/or a die and shader program instruction memory 34 may be formed on, located on, and/or disposed on the same microchip, integrated circuit, and/or die. That is, in such examples, a single microchip, integrated circuit and/or die may include both GPU 12 and shader program instruction memory 34.

According to this disclosure, CPU 6 (e.g., through GPU driver 28) may be configured to load shader programs into shader program instruction memory 34 such that at least two different shader programs of a common shader program type reside in shader program instruction memory 34 at a given point in time. For example, GPU driver 28 may load two different vertex shader programs (i.e., two shader programs of a vertex shader program type) into shader program instruction memory 34 such that both vertex shader programs reside in memory 34 and are capable of being executed by shader unit 32 at a given point in time. In a similar manner, GPU driver 28 may load two different pixel shader programs (i.e., two shader programs of a pixel shader program type) into shader program instruction memory 34 such that both pixel shader programs reside in memory 34 and are capable of being executed by shader unit 32 at a given point in time. Similar techniques may be applied to any other type of shader program, e.g., a geometry shader program, a hull shader program, a domain shader program and/or a compute shader program.

The type of shader program may be indicative of the type of data upon which the shader program is configured to operate and/or the type of operations performed by the shader program. For example, a shader program of a vertex shader type may be configured to perform per-vertex operations on vertices, and a shader program of a pixel shader type may be configured to perform per-pixel operations on pixels and/or fragments. Similarly, a shader program of a geometry shader program type may be configured to perform per-primitive operations on primitives, a shader program of a hull shader program type may be configured to perform per-patch operations on patch control points, a shader program of a domain shader program type may be configured to perform per-texture coordinate operations on texture coordinates and control points, and a shader program of a compute shader program type may be configured to perform per-general purpose data operations on general purpose data.

In some examples, shader program instruction memory 34 may be an instruction memory from which shader unit 32 fetches (e.g., retrieves and/or obtains) instructions of a shader program for processing by shader unit 32 during execution of the shader program by shader unit 32. For example, shader unit 32 may include a program counter register that stores a program counter value indicative of a memory location in shader program instruction memory 34 from which to fetch one or more instructions for a shader program executing on shader unit 32, and a control unit configured to fetch one or more instructions from shader program instruction memory 34 during execution of a shader program based on a program counter value stored in the program counter register. The control unit may, in some examples, be configured to execute the shader program during a plurality of instruction cycles where, during each instruction cycle, one or more instructions of the shader program are processed by the shader unit. During at least two or more of the plurality of instruction cycles, the control unit of shader unit 32 may be configured to fetch one or more instructions from shader program instruction memory 34. In other words, in such examples, shader program instruction memory 34 may act as an instruction store and/or as an instruction cache for the execution of shader programs on shader unit 32 during the execution of a shader program by shader unit 32.

Figure 3:
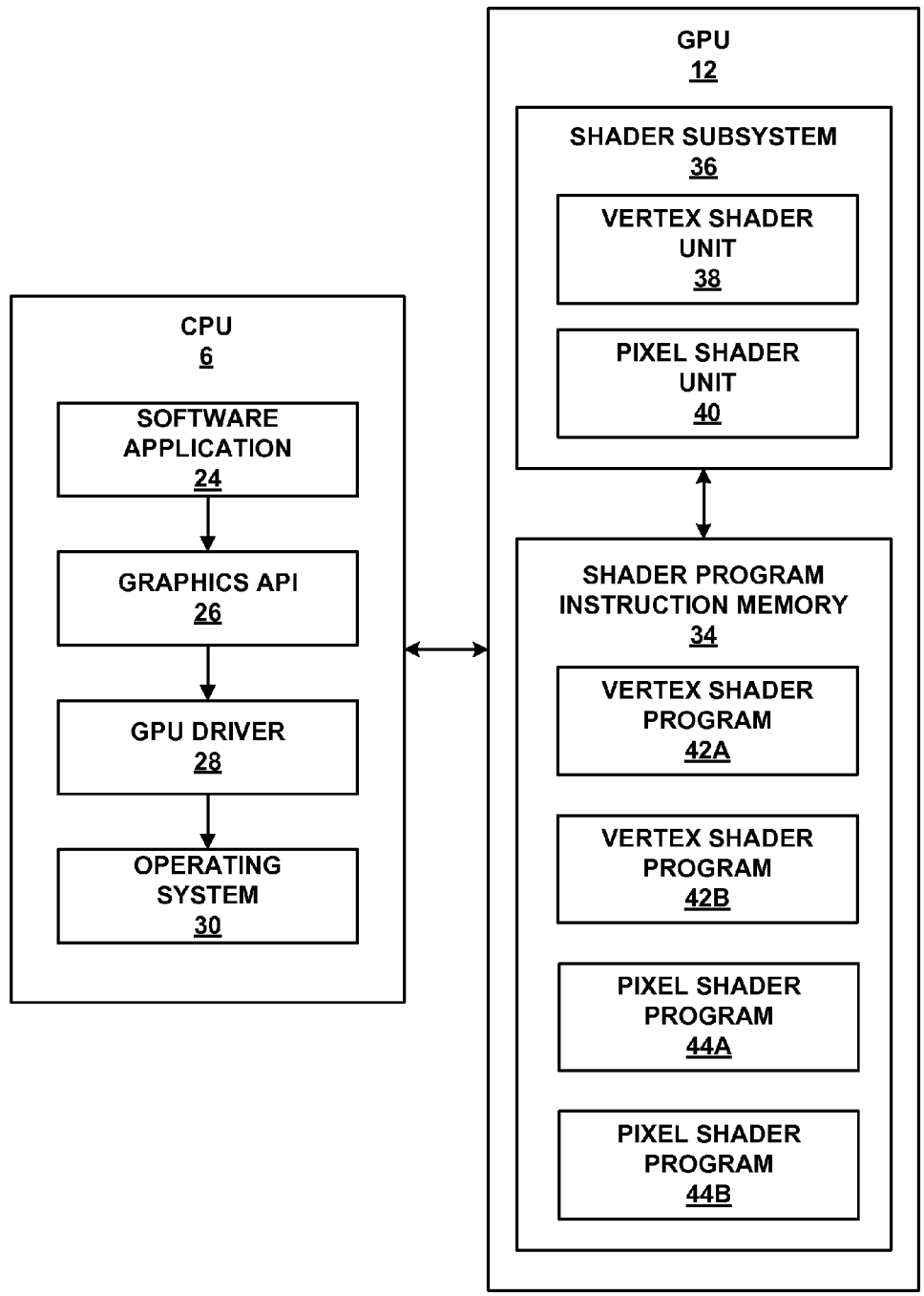
FIG. 3 is a block diagram illustrating an example shader program instruction memory state that may result after performing an example shader program packing technique in accordance with this disclosure.

FIG. 3 is a block diagram illustrating an example shader program instruction memory state that may result after performing an example shader program packing technique in accordance with this disclosure. The system shown in FIG. 3 is similar to that of FIG. 2 except that shader unit 32 of FIG. 2 has been replaced by a shader subsystem 36 and shader program instruction memory 34 has been populated with shader programs. Shader subsystem 36 includes a vertex shader unit 38 configured to execute vertex shader programs, and a pixel shader unit 40 configured to execute pixel shader programs. Shader program instruction memory 34 includes vertex shader programs 42A, 42B and pixel shader programs 44A, 44B. Similarly numbered components in FIGS. 2 and 3 have the same or similar functionality and construction. Accordingly, in the interest of brevity and to avoid redundancy, the operation and construction of these shared components will not be described in further detail.

As shown in FIG. 3, GPU driver 28 has loaded multiple shader programs into shader program instruction memory 34 such that the resulting memory state stores two vertex shader programs 42A, 42B and two pixel shader programs 44A, 44B. Vertex shader program 42A may be different than vertex shader program 42B. Similarly, pixel shader program 44A may be different than pixel shader program 44B. A first shader program may be said to be different than a second shader program, for example, when the first shader program includes a set of instructions that is different than those of the second shader program and/or when the first shader program includes a set of instructions that implements a different algorithm than that which is implemented by the set of instructions included in the second shader program. Vertex shader programs 42A, 42B may represent two shader programs of a common type. Similarly, pixel shader programs 44A, 44B may represent two shader programs of a common type.

Because shader program instruction memory 34 in FIG. 3 includes two different vertex shader programs 42A, 42B and two different pixel shader programs 44A, 44B, GPU 12 may be able to seamlessly switch between the execution of different shader programs of the same type without necessarily needing to reload such shader programs into shader program instruction memory 34 every time a shader program execution switch occurs. By removing the need to reload shader programs between the execution of different shader programs of the same type, the techniques of this disclosure may be able to improve the processing efficiency of a graphics processing system.

The operation of an example embodiment of GPU driver 28 will now be described. GPU driver 28 may receive a first load shader program instruction from software application 24 executing on host CPU 6 that instructs GPU driver 28 to load a first shader program of a first shader program type onto GPU 12. In response to receiving the first load shader program instruction, GPU driver 28 may issue one or more commands to GPU 12 (e.g., via operating system 30) that causes the first shader program to be loaded into shader program instruction memory 34. GPU driver 28 may receive a second load shader program instruction from software application 24 that instructs GPU driver 28 to load a second shader program of the first shader program type onto GPU 12. In response to receiving the second load shader program instruction, GPU driver 28 may determine whether there is a sufficient amount of free space available in shader program instruction memory 34 to store the second shader program. Free space may refer to, e.g., one or more address ranges within shader program instruction memory 34 that are not currently allocated to store a shader program. If there is a sufficient amount of free space available to store the second shader program, then GPU driver 28 may load the second shader program into the free space of shader program instruction memory 34.

On the other hand, if there is not a sufficient amount of free space available, then GPU driver 28 may determine whether evicting one or more shader programs would free up enough memory space in memory 34 such that there would be a sufficient amount of free space available to store the second shader program. If evicting one or more shader programs would free up enough memory space, then GPU driver 28 may evict one or more shader programs that were previously loaded into shader program instruction memory 34 to generate the additional free space to store the second shader program. Otherwise, if evicting one or more shader programs would not free up enough memory space, then GPU driver 28 may determine to overwrite all shader programs in memory 34.

Evicting a shader program from shader program instruction memory 34 may include, in some examples, overwriting all or a portion of the shader program with a new shader program that is loaded into memory 34. In additional examples, evicting the shader program from shader program instruction memory 34 may involve removing the shader program from memory 34 and/or deallocating a portion of memory 34 assigned to the shader program.

When loading shader programs into shader program instruction memory 34, GPU driver 28 may, in some examples, load the shader program into memory 34 in such a way as to reduce fragmentation. For example, GPU driver 28 may determine which region of free space in shader program instruction memory 34 is the smallest region into which the shader program will fit, and load the shader program into such a region of memory 34.

GPU driver 28 may store state information that is indicative of the state of shader program instruction memory 34 in a local memory space, e.g., system memory 10 in FIG. 1. Using vertex shader programs as an example, GPU driver 28 may keep track of an amount of on-chip memory available (e.g., memory available in shader program instruction memory 34) for vertex shader programs and which vertex shader programs are stored in the available memory. For example, when a vertex shader program is loaded, GPU driver 28 may track the memory range used by the vertex shader program. In addition, for each vertex shader program stored in shader program instruction memory 34, GPU driver 28 may track the last time that the shader program was accessed or executed and/or the frequency in which the shader program was accessed or executed. This state information may be used by GPU driver 28 to determine whether there is a sufficient amount of free space available when loading vertex shader programs and/or to determine which vertex shader programs to evict when insufficient free space is available. Similar state information may also be stored for the other shader program types, e.g., for pixel shader programs.

GPU driver 28 may select which shader programs to evict from the shader program instruction memory 34 according to various eviction techniques. According to a first eviction technique, GPU driver 28 may determine a least frequently used (LFU) shader program of a particular shader program type, and evict the LFU shader program. If evicting the LFU shader program does not free up a sufficient amount of memory space, then GPU driver 28 may evict the next LFU shader program from the remaining shader programs and any subsequent LFU shader programs until there is a sufficient amount of free space for the new shader program to be loaded. According to a second eviction technique, GPU driver 28 may determine a least recently used (LRU) shader program of a particular shader program type, and evict the LRU shader program. If evicting the LRU shader program does not free up a sufficient amount of memory space, then GPU driver 28 may evict the next LRU shader program from the remaining shader programs and any subsequent LRU shader programs until there is a sufficient amount of free space for the new shader program to be loaded.

According to a third eviction technique, GPU driver 28 may determine a set of N LFU shader programs for a particular shader program type, where N is an integer $\geq 1$. The set of N LFU shader programs may include shader programs that have frequencies of use that are within a threshold level of each other and are lower than those of the other shader programs not in the set of N LFU shader programs. For example, in some examples, two or more shader programs that are not frequently used may have frequencies of use that are approximately equal to each other, e.g., within a threshold level of tolerance of each other. According to the third eviction technique, GPU driver 28 may determine the LRU shader program from the set of N LFU shader programs, and evict the LRU shader program. GPU driver 28 may determine if evicting the LRU shader program from the set of N LFU shader programs would free up a sufficient amount of memory space to allow the new shader program to be loaded into the memory. GPU driver 28 may consider free space surrounding the LRU shader program (e.g., free space due to fragmentation) when determining whether evicting the LRU shader program would free up a sufficient amount of memory. If evicting the LRU shader program from the set of N LFU shader programs would free up a sufficient amount of memory space, then GPU driver 28 may evict the LRU shader program from memory 34 and load the new shader program into memory 34. On the other hand, if evicting the LRU shader program from the set of N LFU shader programs would not free up a sufficient amount of memory space, then GPU driver 28 may evict the next-most LRU shader programs from the set of N LFU shader programs until enough free space has been generated for the new shader program to be loaded into the memory.

Figure 4:
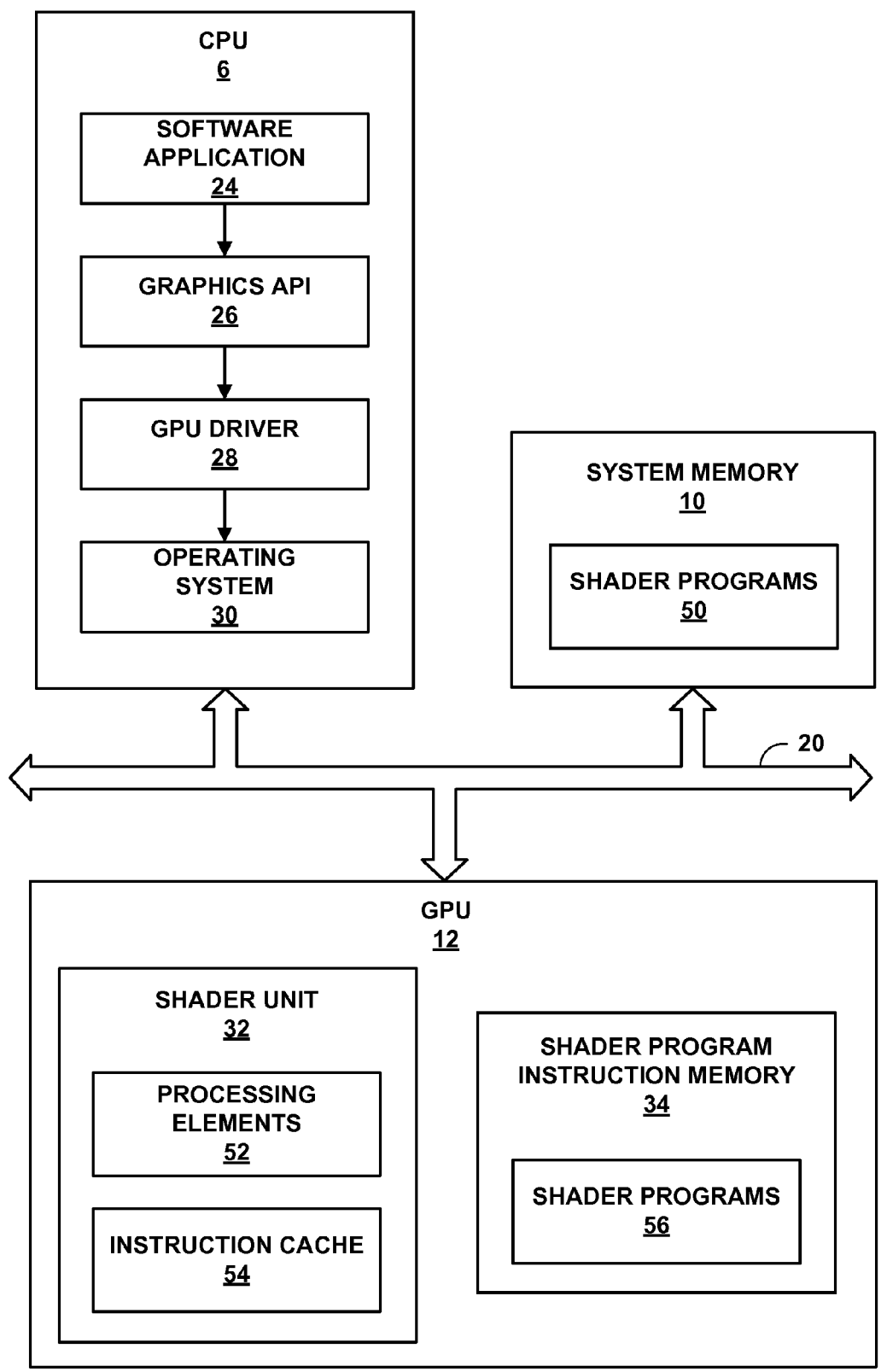
FIG. 4 is a block diagram illustrating an example CPU, an example GPU, and an example system memory that may be used in the computing device of FIG. 1 in accordance with this disclosure.

FIG. 4 is a block diagram illustrating an example CPU 6, an example GPU 12, and an example system memory 10 that may be used in the computing device 2 of FIG. 1 in accordance with this disclosure. The components shown in FIG. 4 are similar to those of FIG. 2 except that a system memory 10 and a bus 20 have been included in FIG. 4. System memory 10 and bus 20 may have the same or similar functionality as system memory 10 and bus 20, respectively, in FIG. 1 except that memory controller 8 has been omitted from FIG. 4. The functionality of memory controller 8 in FIG. 1 may, in some examples, be incorporated into system memory 10 shown in FIG. 4 and/or into one or more other components shown in FIG. 4. As shown in FIG. 4, CPU 6, GPU 12, and system memory 10 are communicatively coupled to each via bus 20. As also shown in FIG. 4, system memory 10 may store shader programs 50.

CPU 6 of FIG. 4 may be similar and/or identical to CPU 6 shown in FIGS. 2 and/or 3. GPU 12 of FIG. 4 may be similar to GPU 12 shown in FIG. 2 except that shader unit 32 is illustrated in FIG. 4 as including processing elements 52 and instruction cache 54 and that shader program instruction memory 34 is illustrated in FIG. 4 as storing shader programs 56. Accordingly, in the interest of brevity and to avoid redundancy, the general operation and construction of CPU 6 and GPU 12 will not be described in further detail.

In the example system of FIG. 4, system memory 10 is an off-chip memory. That is, system memory 10 may be formed on, located on, and/or disposed on a microchip, an integrated circuit, and/or a die that is different than the microchip, integrated circuit, and/or die upon which GPU 12 is formed, located, and/or disposed. In contrast to system memory 10, shader program instruction memory 34 is an on-chip memory in the example system of FIG. 4. In other words, shader program instruction memory 34 may be formed on, located on, and/or disposed on the same microchip, integrated circuit, and/or die as GPU 12.

Processing elements 52 may be configured to execute one or more shader programs 56 that are stored in shader program instruction memory 34. During execution of a shader program, processing elements 52 may fetch or retrieve one or more instructions of the shader program from shader program instruction memory 34. In some examples, processing elements 52 may use instruction cache 54 to assist in retrieving the instructions from shader program instruction memory 34. If multiple shader programs 56 of a common shader program type are loaded into shader program instruction memory 34, then processing elements 52 may be configured to switch from executing instructions associated with a first shader program stored in shader program instruction memory 34 to executing instructions associated with a second shader program stored in shader program instruction memory 34 without requiring shader program instruction memory 34 to be reloaded. The first and second shader programs may be the same type of shader program (e.g., vertex shader programs, pixel shader programs, geometry shader programs, hull shader programs, domain shader programs, compute shader programs etc.).

Instruction cache 54 is configured to retrieve one or more instructions of a shader program from shader program instruction memory 34, and to store the one or more instructions in a cache within shader unit 32 for subsequent execution by processing elements 52. Instruction cache 54 may be configured to retrieve one or more instructions from shader program instruction memory 34 in advance of the instruction cycle in which the one or more instructions are to be executed by shader unit 21. The retrieval of an instruction in advance of the instruction cycle in which the instruction is to be executed may be referred to herein as pre-fetching instructions. The pre-fetching of instructions by instruction cache 54 may, in some examples, ensure that a sufficient number of instructions are ready to be executed by shader unit 12 even if there is a delay in retrieving instructions from shader program instruction memory 34, thereby preventing shader unit 12 from being starved of instructions.

In some examples, shader program instruction memory 34 may be implemented as a fully-addressable memory. That is, in contrast to a cache where each storage slot in the cache may map to multiple different storage slots in an underlying memory, each memory storage slot in shader program instruction memory 34 may be uniquely addressable. In other words, each memory storage slot in shader program instruction memory 34 may be configured to store data associated with a single memory address.

A fully-addressable memory may allow a CPU and/or a graphics driver to configure how many shader programs 56 are stored in shader program instruction memory 34 and in what locations such shader programs 56 are stored in shader program instruction memory 34. For example, a fully-addressable memory may allow CPU 6 and/or GPU driver 28 to cause a plurality of shader programs 56 of a common shader program type to be loaded into shader program instruction memory 34 of GPU 12 such that each shader program in the plurality of shader programs 56 resides in shader program instruction memory 34 at a common point in time in accordance with the techniques of this disclosure. As another example, a fully-addressable memory may allow CPU 6 and/or GPU driver 28 to practice the shader program loading and eviction techniques described in this disclosure.

Shader programs 50, which are stored in system memory 10, may be any combination of source code versions of shader programs or compiled versions of shader programs. In some examples, when CPU 6 and/or GPU driver 28 loads one or more shader programs 56 into shader program instruction memory 34, CPU 6 and/or GPU driver 28 may retrieve one or more shader programs 50 from system memory 10 and load the retrieved shader programs into shader program instruction memory 34. In other words, in such examples, system memory 10 may serve as a staging area for shader programs that may be loaded onto GPU 12 as part of one or more graphics processing applications and/or computing applications.

Shader programs 56 may be compiled shader programs and/or machine code shader programs. The compiled shader programs and/or the machine code shader programs may, in some examples, be configured to be executed by shader unit 32 without further compilation, preparation, modification and/or assembly. In other words, in such examples, each of shader programs 56 is not merely a snippet or a portion of a shader program that is yet to be built, but is instead a fully-functional shader program.

In examples where one or more of shader programs 50 are source code, CPU 6 and/or GPU driver 28 may compile the source code versions of the shader programs into compiled versions of the shader programs prior to loading the shader programs into shader program instruction memory 34. In examples where one or more of shader programs 50 are compiled code or machine code, the shader code for one or more shader programs 56 loaded into shader program instruction memory 34 may, in some examples, be identical to the shader code for the corresponding shader programs 50 stored in system memory 10.

In some examples, the capacity of shader program instruction memory 34 may be less than the capacity of a region of system memory 10 that is allocated for storing shader programs 50. For example, the capacity of shader program instruction memory 34 may, in some examples, be equal to the a maximum shader program size defined by a particular graphics application programming interface (API) (e.g., an OpenGL API or a DirectX API) for a particular shader program type. In such examples, shader program instruction memory 34 may not necessarily be guaranteed to be large enough to store multiple shader programs of the same shader program type if the shader programs are relatively large. However, if one or both of the shader programs are relatively small, in such examples, then the techniques of this disclosure may be able to pack multiple shader programs 56 of the same shader program type into shader program instruction memory 34 even though the memory is only guaranteed, in such examples, to be large enough to store a single shader program.

Because shader program instruction memory 34 is located on the same chip as GPU 12, shader unit 32 may be able to, during execution of a shader program, retrieve instructions more efficiently than a shader unit that executes instructions stored in an off-chip memory, such as, e.g., system memory 10. Moreover, because the techniques of this disclosure allow for multiple shader programs of a same shader program type to be stored in shader program instruction memory 34, shader unit 12 may be able to switch between the execution of different on-chip shader programs without needing to reload the on-chip shader program instruction memory 34, thereby providing further performance improvement in systems that may need to frequently switch between executing different shader programs of a common shader program type.

FIGS. 5-9 are flow diagrams illustrating various techniques for loading and/or evicting shader programs in accordance with this disclosure. The example techniques shown in FIG. 5-9 are described as being performed by CPU 6 shown in FIGS. 1 and 2 for exemplary purposes. In other examples, the techniques illustrated in FIGS. 5-9 may be implemented in any of the systems or components shown in FIGS. 1-4 of this disclosure (e.g., graphics driver 28 operating on CPU 6) or in other types of graphics processing systems not specifically mentioned herein.

Figure 5:
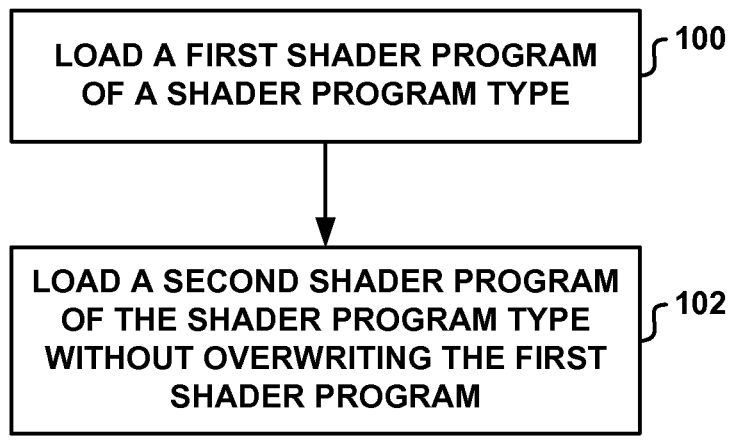
FIG. 5 is a flow diagram illustrating an example technique for causing two shader programs of a common shader program type to be loaded into a shader program instruction memory in accordance with this disclosure.

FIG. 5 is a flow diagram illustrating an example technique for causing two shader programs of a common shader program type to be loaded into a shader program instruction memory in accordance with this disclosure. CPU 6 loads a first shader program of a shader program type into shader program instruction memory 34 (100). CPU 6 loads a second shader program of the shader program type into shader program instruction memory 34 without overwriting any portion of the first shader program (102). The second shader program may be different than the first shader program, and the shader program type of the second shader program may be the same as the shader program type of the first shader program.

In some examples, CPU 6 may determine one or more ranges of available memory space in shader program instruction memory 34 after the first shader program has been loaded into shader program instruction memory 34, and load the second shader program into the one or more ranges of available memory space. Available memory space may refer to memory space that is not presently allocated for the storage of and/or is not presently storing a particular shader program. Available memory space may be alternatively referred to herein as free memory space.

After performing process blocks 100 and 102, two shader programs of a common shader program type may reside in shader program instruction memory 34 at a common point in time. In some examples, shader unit 32 may be configured to execute each of the first and second shader programs directly from shader program instruction memory 34, and to seamlessly switch between executing the first shader program and the second shader program without necessarily requiring either of the first and second shader programs to be reloaded into shader program instruction memory 34. The ability of shader unit 32 to seamlessly switch between the execution of different shader programs may be particularly useful, for example, in applications that require a GPU to repeatedly switch between different shader programs during the execution of an application, e.g., a GUI application that interleaves BLIT operations that use a first shader program with rendering operations that use a second shader program different that the first shader program. In such examples, reloading new shader programs into shader program instruction memory 34 every time the shader program to be executed is switched may consume a significant portion of the rendering time in such applications. By loading multiple shader programs of a common program type into shader program instruction memory 34 according to the techniques of this disclosure, however, the performance overhead due to reloading shader programs may be significantly reduced, thereby improving the performance of the overall graphics processing system.

Figure 6:
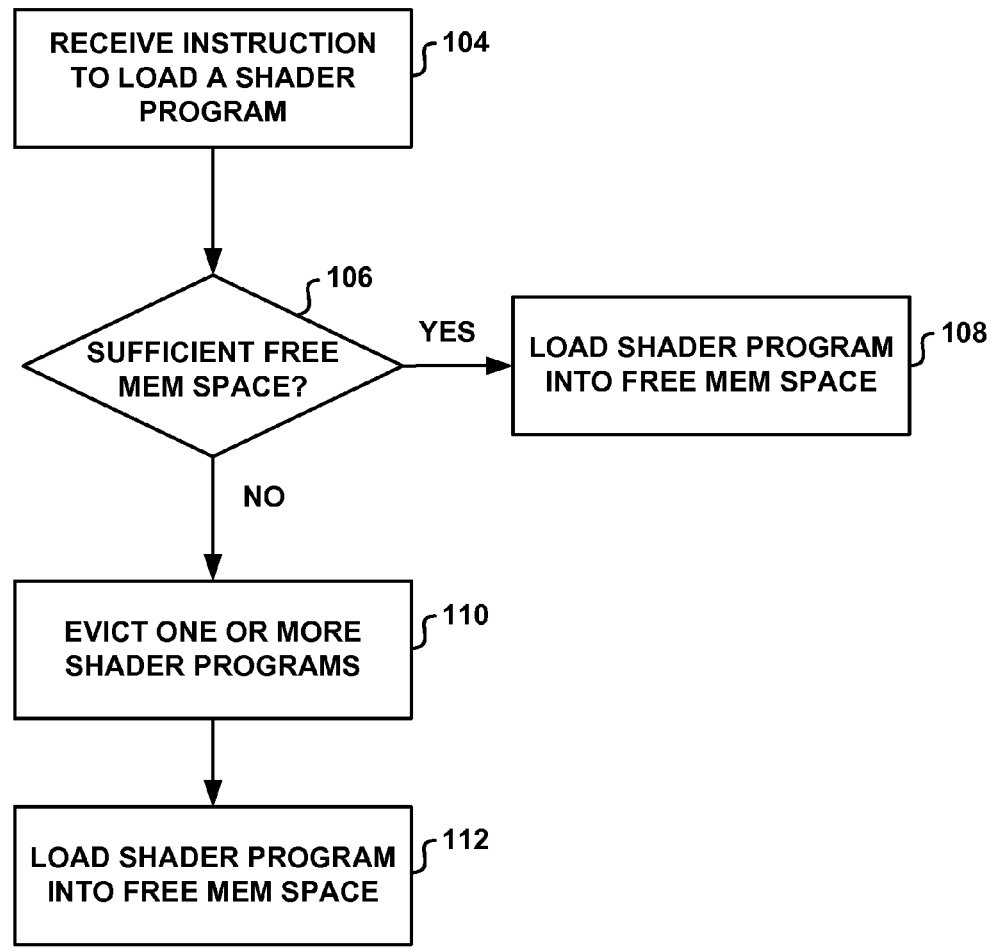
FIG. 6 is a flow diagram illustrating an example technique for loading shader programs into a shader program instruction memory in accordance with this disclosure.

FIG. 6 is a flow diagram illustrating an example technique for loading shader programs into a shader program instruction memory in accordance with this disclosure. CPU 6 receives an instruction from software application 24 to load a particular shader program into shader program instruction memory 34 (104). The instruction may specify the particular shader program to load into shader program instruction memory 34. CPU 6 determines if shader program instruction memory 34 has a sufficient amount of available memory space to store the shader program to be loaded into shader program instruction memory 34 (106). In response to determining that there is a sufficient amount of available memory space to store the shader program to be loaded into shader program instruction memory 34, CPU 6 loads the shader program into a portion of the available memory space in shader program instruction memory 34 (108).

On the other hand, in response to determining that shader program instruction memory 34 does not have a sufficient amount of available memory space to store the shader program to be loaded into shader program instruction memory 34, CPU 6 evicts one or more shader programs from shader program instruction memory 34 to generate enough available memory space in shader program instruction memory 34 to store the shader program to be loaded (110). CPU 6 loads the shader program into a portion of the available memory space in shader program instruction memory 34 (112).

CPU 6 may use a variety of techniques to determine which of the shader programs to evict from shader program instruction memory 34. In some examples, CPU 6 may select a least recently used (LRU) shader program to evict. In further examples, CPU 6 may select a least frequently used (LFU) shader program to evict. In additional examples, CPU 6 may determine N LFU shader programs, and select the LRU shader program of the N LFU shader programs to evict. Other examples are possible and within the scope of this disclosure.

Figure 7:
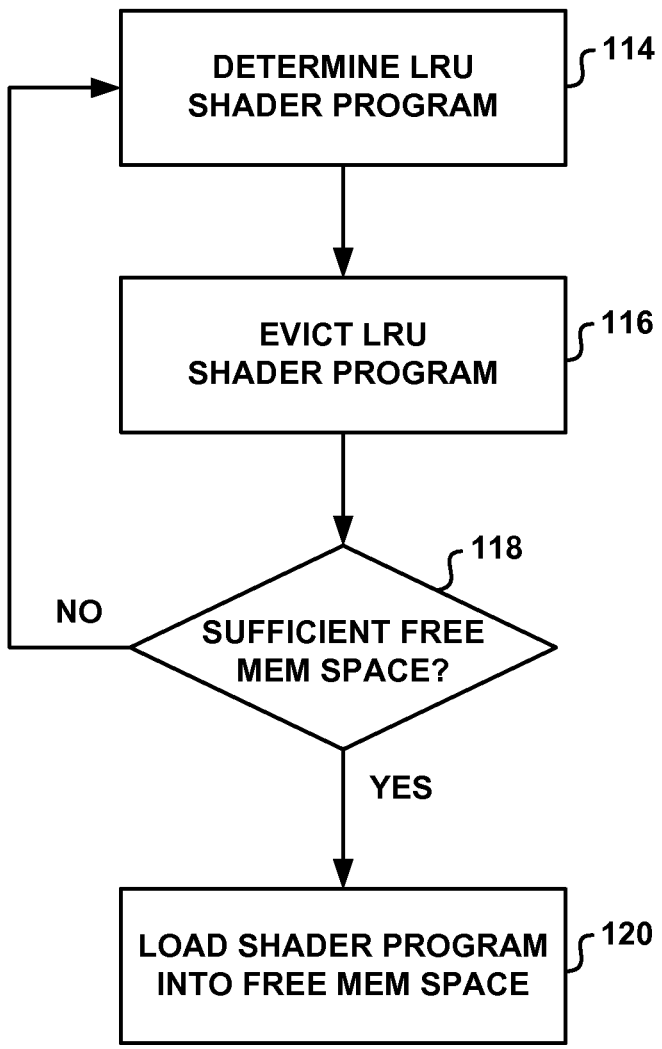
FIG. 7 is a flow diagram illustrating an example technique for evicting shader programs from a shader program instruction memory in accordance with this disclosure.

FIG. 7 is a flow diagram illustrating an example technique for evicting shader programs from a shader program instruction memory in accordance with this disclosure. In some examples, the technique illustrated in FIG. 7 may be used to implement process boxes 110 and 112 shown in FIG. 6. CPU 6 determines a least recently used (LRU) shader program from the set of one or more shader programs presently stored in shader program instruction memory 34 (114). CPU 6 evicts the LRU shader program from shader program instruction memory 34 (116). CPU 6 determines if shader program instruction memory 34 has a sufficient amount of available memory space to store the shader program to be loaded into shader program instruction memory 34 (118). In response to determining that there is a sufficient amount of available memory space to store the shader program to be loaded into shader program instruction memory 34, CPU 6 loads the shader program into a portion of the available memory space in shader program instruction memory 34 (120).

On the other hand, in response to determining that shader program instruction memory 34 does not have a sufficient amount of available memory space to store the shader program to be loaded into shader program instruction memory 34, CPU 6 determines an LRU shader program from the remaining set of shader programs presently stored in shader program instruction memory 34 (114), and evicts the LRU shader program (116). CPU 6 continues to evict LRU shader programs from the remaining shader programs until a sufficient amount of memory space is available in shader program instruction memory 34 to store the shader program to be loaded. After determining that shader program instruction memory 34 has a sufficient amount of memory space to store the shader program to be loaded into shader program instruction memory 34, CPU 6 loads the shader program into a portion of the available memory space in shader program instruction memory 34 (120). The remaining set of shader programs presently stored in shader program instruction memory 34 may include the original set of shader programs stored in shader program instruction memory 34 when the technique in FIG. 7 began executing excluding any LRU shader programs that have already been evicted in process box 116.

Figure 8:
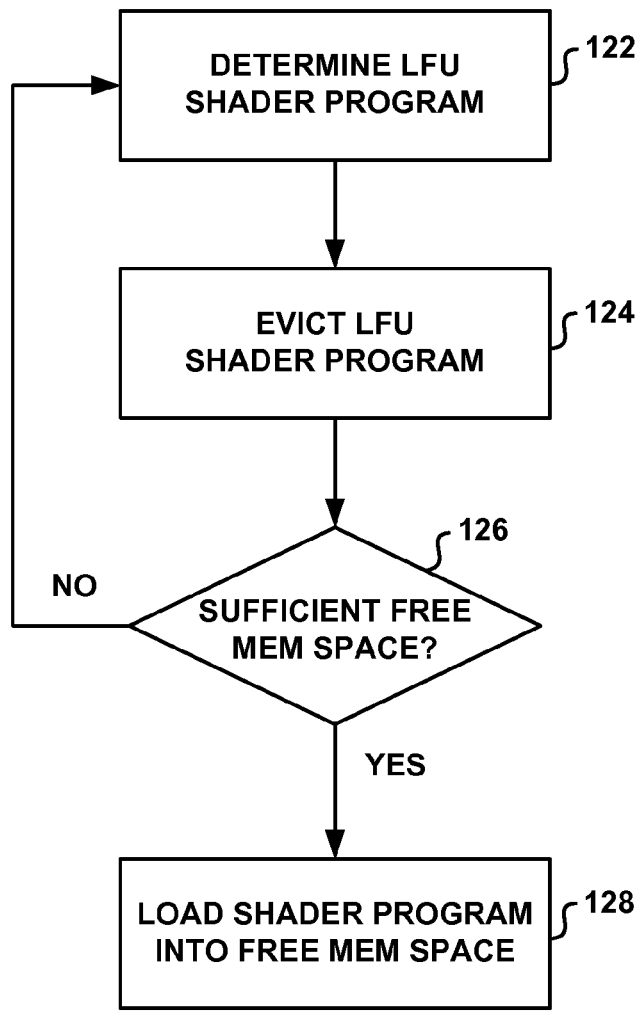
FIG. 8 is a flow diagram illustrating another example technique for evicting shader programs from a shader program instruction memory in accordance with this disclosure.

FIG. 8 is a flow diagram illustrating another example technique for evicting shader programs from a shader program instruction memory in accordance with this disclosure. In some examples, the technique illustrated in FIG. 8 may be used to implement process boxes 110 and 112 shown in FIG. 6. CPU 6 determines a least frequently used (LFU) shader program from the set of one or more shader programs presently stored in shader program instruction memory 34 (122). CPU 6 evicts the LFU shader program from shader program instruction memory 34 (124). CPU 6 determines if shader program instruction memory 34 has a sufficient amount of available memory space to store the shader program to be loaded into shader program instruction memory 34 (126). In response to determining that there is a sufficient amount of available memory space to store the shader program to be loaded into shader program instruction memory 34, CPU 6 loads the shader program into a portion of the available memory space in shader program instruction memory 34 (128).

On the other hand, in response to determining that shader program instruction memory 34 does not have a sufficient amount of available memory space to store the shader program to be loaded into shader program instruction memory 34, CPU 6 determines an LFU shader program from the remaining set of shader programs presently stored in shader program instruction memory 34 (122), and evicts the LFU shader program (124). CPU 6 continues to evict LFU shader programs from the remaining shader programs until a sufficient amount of memory space is available in shader program instruction memory 34 to store the shader program to be loaded. After determining that shader program instruction memory 34 has a sufficient amount of memory space to store the shader program to be loaded into shader program instruction memory 34, CPU 6 loads the shader program into a portion of the available memory space in shader program instruction memory 34 (128). The remaining set of shader programs presently stored in shader program instruction memory 34 may include the original set of shader programs stored in shader program instruction memory 34 when the technique in FIG. 8 began executing excluding any LFU shader programs that have already been evicted in process box 124.

Figure 9:
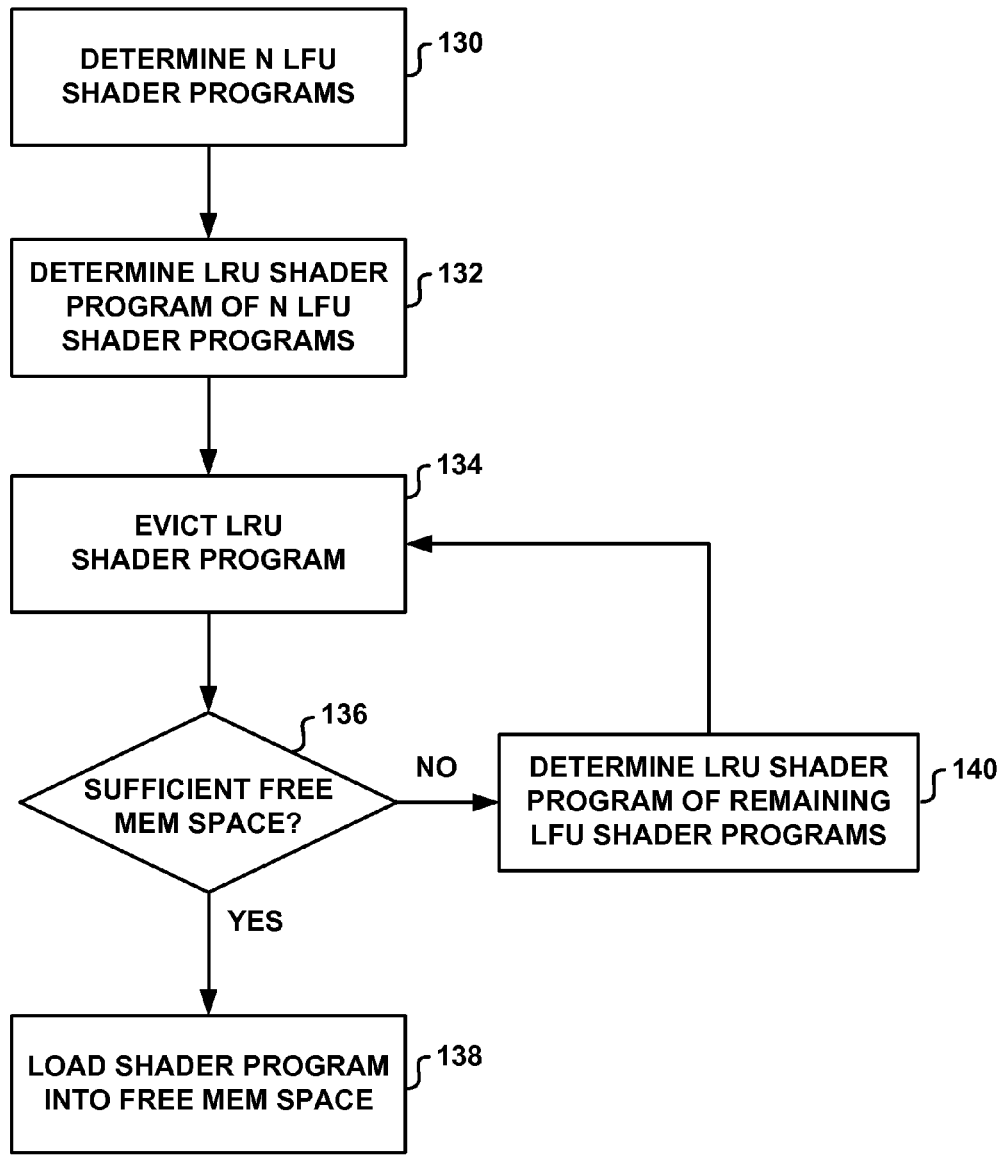
FIG. 9 is a flow diagram illustrating another example technique for evicting shader programs from a shader program instruction memory in accordance with this disclosure.

FIG. 9 is a flow diagram illustrating another example technique for evicting shader programs from a shader program instruction memory in accordance with this disclosure. In some examples, the technique illustrated in FIG. 9 may be used to implement process boxes 110 and 112 shown in FIG. 6.

CPU 6 determines a set of N least frequently used (LFU) shader programs from the set of one or more shader programs presently stored in shader program instruction memory 34 where N is an integer greater than or equal to one (130). CPU 6 determines a least recently used (LRU) shader program from the set of one N LFU shader programs (132). CPU 6 evicts the LRU shader program from shader program instruction memory 34 (134). CPU 6 determines if shader program instruction memory 34 has a sufficient amount of available memory space to store the shader program to be loaded into shader program instruction memory 34 (136). In response to determining that there is a sufficient amount of available memory space to store the shader program to be loaded into shader program instruction memory 34, CPU 6 loads the shader program into a portion of the available memory space in shader program instruction memory 34 (138).

On the other hand, in response to determining that shader program instruction memory 34 does not have a sufficient amount of available memory space to store the shader program to be loaded into shader program instruction memory 34, CPU 6 determines an LRU shader program from the remaining shader programs in the set of N LFU shader programs (140), and evicts the LRU shader program (124). CPU 6 continues to evict LRU shader programs from the remaining shader programs in the set of N LFU shader programs until a sufficient amount of memory space is available in shader program instruction memory 34 to store the shader program to be loaded. After determining that shader program instruction memory 34 has a sufficient amount of memory space to store the shader program to be loaded into shader program instruction memory 34, CPU 6 loads the shader program into a portion of the available memory space in shader program instruction memory 34 (138). The remaining shader programs of the set of N LFU shader programs may include the original set of LFU shader programs determined in process box 130 excluding any LRU shader programs that have already been evicted in process box 134.

The shader loading and eviction techniques described herein can be applied to any type of shader program and to any type of shader memory configuration. For example, the techniques of this disclosure may be applied to a shader program instruction memory 34 that has separate memory pools for each type of shader program as well as a shader program instruction memory 34 that has a combined memory pool, e.g., a memory pool that store multiple types of shader programs.

The techniques in this disclosure may be particularly useful in the context of rendering low-complexity, low-pixel count objects because the shader programs that are used in such contexts are typically small enough to allow multiple shader programs to be packed into the same shader memory. In such cases, the multiple shader programs can be reused without necessarily having to evict and/or reload any of the shader programs.

For common use cases (e.g., a user interface (UI)), most shader programs may fit inside of an on-chip memory. For semi-common use cases, (e.g., a UI plus a simple application), a BLIT operation may use the same shader across the frame, but may be interleaved with many other types of rendering operations. By utilizing the techniques of this disclosure in these cases, a GPU driver and the GPU may pay a lower cost for executing BLIT operations because the shader programs do not need to be evicted by the "normal" draw operation and reloaded by the BLIT operation.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry such as discrete hardware that performs processing.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware, firmware, and/or software components, or integrated within common or separate hardware or software components.

The techniques described in this disclosure may also be stored, embodied or encoded in a computer-readable medium, such as a computer-readable storage medium that stores instructions. Instructions embedded or encoded in a computer-readable medium may cause one or more processors to perform the techniques described herein, e.g., when the instructions are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable storage media that is tangible.

Computer-readable media may include computer-readable storage media, which corresponds to a tangible storage medium, such as those listed above. Computer-readable media may also comprise communication media including any medium that facilitates transfer of a computer program from one place to another, e.g., according to a communication protocol. In this manner, the phrase "computer-readable media" generally may correspond to (1) tangible computer-readable storage media which is non-transitory, and (2) a non-tangible computer-readable communication medium such as a transitory signal or carrier wave.

Various aspects and examples have been described. However, modifications can be made to the structure or techniques of this disclosure without departing from the scope of the following claims.

What is claimed is:

1. A method comprising:
   causing a plurality of shader programs of a common shader program type to be loaded into an on-chip shader program instruction memory of a graphics processor such that each shader program in the plurality of shader programs resides in the on-chip shader program instruction memory at a common point in time, wherein causing the plurality of shader programs of the common shader program type to be loaded comprises:
   loading a first shader program of the common shader program type into the on-chip shader program instruction memory;
   determining one or more ranges of available memory space in the on-chip shader program instruction memory after the first shader program has been loaded into the on-chip shader program instruction memory;
   loading a second shader program of the common shader program type into one of the one or more ranges of available memory space;
   determining whether the on-chip shader program instruction memory has a sufficient amount of available memory space to store a shader program to be loaded into the on-chip shader program instruction memory; and
   in response to determining that the on-chip shader program instruction memory does not have the sufficient amount of available memory space to store the shader program:
   determining a least frequently used shader program from a set of one or more shader programs stored within the on-chip shader program instruction memory; and
   evicting the least frequently used shader program from the on-chip shader program instruction memory,
   wherein the on-chip shader program instruction memory comprises an instruction cache from which a shader unit fetches instructions during execution of at least one of the plurality of shader programs.

2. The method of claim 1, wherein the common shader program type comprises a shader program type that is indicative of at least one of a type of data upon which the shader program is configured to operate and a type of operation performed by the shader program.

3. The method of claim 1, wherein the common shader program type comprises one of a vertex shader program type, a pixel shader program type, a geometry shader program type, a hull shader program type, a domain shader program type, and a compute shader program type.

4. The method of claim 1, wherein loading the second shader program of the common shader program type into the on-chip shader program instruction memory is performed without overwriting the first shader program.

5. The method of claim 1, wherein evicting the shader program from the on-chip shader program instruction memory comprises:
   overwriting at least a portion of the evicted shader program with at least a portion of the shader program to be loaded into the on-chip shader program instruction memory.

6. A device comprising:
   an on-chip shader program instruction memory comprising an instruction cache from which a shader unit fetches instructions during execution of at least one of a plurality of shader programs;
   a processor configured to:
      cause the plurality of shader programs of a common shader program type to be loaded into the on-chip shader program instruction memory of a graphics processor such that each shader program in the plurality of shader programs resides in the on-chip shader program instruction memory at a common point in time;
      load a first shader program of the common shader program type into the on-chip shader program instruction memory;
      determine one or more ranges of available memory space in the on-chip shader program instruction memory after the first shader program has been loaded into the on-chip shader program instruction memory;
      load a second shader program of the common shader program type into one of the one or more ranges of available memory space;
      determine whether the on-chip shader program instruction memory has a sufficient amount of available memory space to store a shader program to be loaded into the on-chip shader program instruction memory;
      determine a least frequently used shader program from a set of one or more shader programs stored within the on-chip shader program instruction memory; and
      evict the least frequently used shader program from the on-chip shader program instruction memory in response to determining that the on-chip shader program instruction memory does not have the sufficient amount of available memory space to store the shader program.

7. The device of claim 6, wherein the common shader program type comprises a shader program type that is indicative of at least one of a type of data upon which the shader program is configured to operate and a type of operation performed by the shader program.

8. The device of claim 6, wherein the common shader program type comprises one of a vertex shader program type, a pixel shader program type, a geometry shader program type, a hull shader program type, a domain shader program type, and a compute shader program type.

9. The device of claim 6, wherein the processor is further configured to load a the second shader program of the common shader program type into the on-chip shader program instruction memory without overwriting the first shader program.

10. The device of claim 6, wherein the processor is further configured to overwrite at least a portion of the evicted shader program with at least a portion of the shader program to be loaded into the on-chip shader program instruction memory.

11. The device of claim 6, wherein the device comprises a wireless communication device.

12. The device of claim 6, wherein the device comprises a mobile phone handset.

13. An apparatus comprising:
   means for loading a shader program into an on-chip shader program instruction memory of a graphics processor;
   means for causing a plurality of shader programs of a common shader program type to be loaded into the on-chip shader program instruction memory of the graphics processor such that each shader program in the plurality of shader programs resides in the on-chip shader program instruction memory at a common point in time;
   means for loading a first shader program of the common shader program type into the on-chip shader program instruction memory;
   means for determining one or more ranges of available memory space in the on-chip shader program instruction memory after the first shader program has been loaded into the on-chip shader program instruction memory;
   means for loading a second shader program of the common shader program type into one of the one or more ranges of available memory space;
   means for determining whether the on-chip shader program instruction memory has a sufficient amount of available memory space to store a shader program to be loaded into the on-chip shader program instruction memory;
   means for determining a least frequently used shader program from a set of one or more shader programs stored within the on-chip shader program instruction memory in response to determining that the on-chip shader program instruction memory does not have the sufficient amount of available memory space to store the shader program; and
   means for evicting the least frequently used shader program from the on-chip shader program instruction memory in response to determining that the on-chip shader program instruction memory does not have the sufficient amount of available memory space to store the shader program,
   wherein the on-chip shader program instruction memory comprises an instruction cache from which a shader unit fetches instructions during execution of at least one of the plurality of shader programs.

14. The apparatus of claim 13, wherein the common shader program type comprises a shader program type that is indicative of at least one of a type of data upon which the shader program is configured to operate and a type of operation performed by the shader program.

15. The apparatus of claim 13, wherein the common shader program type comprises one of a vertex shader program type, a pixel shader program type, a geometry shader program type, a hull shader program type, a domain shader program type, and a compute shader program type.

16. The apparatus of claim 13, wherein the means for loading a second shader program of the common shader program type into the on-chip shader program instruction memory loads the second shader program without overwriting the first shader program.

17. The apparatus of claim 13, wherein the means for evicting the shader program from the on-chip shader program instruction memory comprises:

means for overwriting at least a portion of the evicted shader program with at least a portion of the shader program to be loaded into the on-chip shader program instruction memory.

18. A non-transitory computer-readable storage medium storing instructions that, when executed, cause one or more processors to:
  cause a plurality of shader programs of a common shader program type to be loaded into an on-chip shader program instruction memory of a graphics processor such that each shader program in the plurality of shader programs resides in the on-chip shader program instruction memory at a common point in time;
  load a first shader program of the common shader program type into the on-chip shader program instruction memory;
  determine one or more ranges of available memory space in the on-chip shader program instruction memory after the first shader program has been loaded into the on-chip shader program instruction memory;
  load a second shader program of the common shader program type into one of the one or more ranges of available memory space;
  determine whether the on-chip shader program instruction memory has a sufficient amount of available memory space to store a shader program to be loaded into the on-chip shader program instruction memory; and
  in response to determining that the on-chip shader program instruction memory does not have the sufficient amount of available memory space to store the shader program:
    determine a least frequently used shader program from a set of one or more shader programs stored within the on-chip shader program instruction memory; and
    evict the least frequently used shader program from the on-chip shader program instruction memory,
  wherein the on-chip shader program instruction memory comprises an instruction cache from which a shader unit fetches instructions during execution of at least one of the plurality of shader programs.

19. The non-transitory computer-readable storage medium of claim 18, wherein the common shader program type comprises a shader program type that is indicative of at least one of a type of data upon which the shader program is configured to operate and a type of operation performed by the shader program.

20. The non-transitory computer-readable storage medium of claim 18, wherein the common shader program type comprises one of a vertex shader program type, a pixel shader program type, a geometry shader program type, a hull shader program type, a domain shader program type, and a compute shader program type.

21. The non-transitory computer-readable storage medium of claim 18, wherein the instructions further cause the one or more processors to:
  load a second shader program of the common shader program type into the on-chip shader program instruction memory without overwriting the first shader program.

22. The non-transitory computer-readable storage medium of claim 18, wherein the instructions that cause the one or more processors to evict the shader program from the on-chip shader program instruction memory comprise instructions that cause the one or more processors to:
  overwrite at least a portion of the evicted shader program with at least a portion of the shader program to be loaded into the on-chip shader program instruction memory.

23. A method comprising:
  causing a plurality of shader programs of a common shader program type to be loaded into an on-chip shader program instruction memory of a graphics processor such that each shader program in the plurality of shader programs resides in the on-chip shader program instruction memory at a common point in time, wherein causing the plurality of shader programs of the common shader program type to be loaded comprises:
    loading a first shader program of the common shader program type into the on-chip shader program instruction memory;
    determining one or more ranges of available memory space in the on-chip shader program instruction memory after the first shader program has been loaded into the on-chip shader program instruction memory;
    loading a second shader program of the common shader program type into one of the one or more ranges of available memory space;
    determining whether the on-chip shader program instruction memory has a sufficient amount of available memory space to store a shader program to be loaded into the on-chip shader program instruction memory; and
    in response to determining that the on-chip shader program instruction memory does not have the sufficient amount of available memory space to store the shader program,
      determining a least recently used shader program from a set of one or more shader programs stored within the on-chip shader program instruction memory; and
      evicting the least recently used shader program from the on-chip shader program instruction memory,
  wherein the on-chip shader program instruction memory comprises an instruction cache from which a shader unit fetches instructions during execution of at least one of the plurality of shader programs.

24. The method of claim 23, wherein loading the second shader program of the common shader program type into the on-chip shader program instruction memory is performed without overwriting the first shader program.

25. The method of claim 23, wherein evicting the shader program from the on-chip shader program instruction memory comprises:
  overwriting at least a portion of the evicted shader program with at least a portion of the shader program to be loaded into the on-chip shader program instruction memory.

26. A method comprising:
  causing a plurality of shader programs of a common shader program type to be loaded into an on-chip shader program instruction memory of a graphics processor such that each shader program in the plurality of shader programs resides in the on-chip shader program instruction memory at a common point in time, wherein causing the plurality of shader programs of the common shader program type to be loaded comprises:
    loading a first shader program of the common shader program type into the on-chip shader program instruction memory;

determining one or more ranges of available memory space in the on-chip shader program instruction memory after the first shader program has been loaded into the on-chip shader program instruction memory;

loading a second shader program of the common shader program type into one of the one or more ranges of available memory space;

determining whether the on-chip shader program instruction memory has a sufficient amount of available memory space to store a shader program to be loaded into the on-chip shader program instruction memory; and in response to determining that the on-chip shader program instruction memory does not have the sufficient amount of available memory space to store the shader program:

determining a set of N least frequently used shader programs from a set of one or more shader programs stored within the on-chip shader program instruction memory, where N is an integer greater than or equal to one;

determining a least recently used shader program from the set of N least frequently used shader programs; and evicting the least recently used shader program from the on-chip shader program instruction memory, wherein the on-chip shader program instruction memory comprises an instruction cache from which a shader unit fetches instructions during execution of at least one of the plurality of shader programs.

27. The method of claim 26, wherein loading the second shader program of the common shader program type into the on-chip shader program instruction memory is performed without overwriting the first shader program.

28. The method of claim 26, wherein evicting the shader program from the on-chip shader program instruction memory comprises:

overwriting at least a portion of the evicted shader program with at least a portion of the shader program to be loaded into the on-chip shader program instruction memory.

29. A device comprising:

an on-chip shader program instruction memory comprising an instruction cache from which a shader unit fetches instructions during execution of at least one of a plurality of shader programs;

a processor configured to:

cause the plurality of shader programs of a common shader program type to be loaded into the on-chip shader program instruction memory of a graphics processor such that each shader program in the plurality of shader programs resides in the on-chip shader program instruction memory at a common point in time;

load a first shader program of the common shader program type into the on-chip shader program instruction memory;

determine one or more ranges of available memory space in the on-chip shader program instruction memory after the first shader program has been loaded into the on-chip shader program instruction memory;

load a second shader program of the common shader program type into one of the one or more ranges of available memory space;

determine whether the on-chip shader program instruction memory has a sufficient amount of available memory space to store a shader program to be loaded into the on-chip shader program instruction memory;

determine a least recently used shader program from a set of one or more shader programs stored within the on-chip shader program instruction memory; and evict the least recently used shader program from the on-chip shader program instruction memory in response to determining that the on-chip shader program instruction memory does not have the sufficient amount of available memory space to store the shader program.

30. The device of claim 29, wherein the processor is further configured to load a the second shader program of the common shader program type into the on-chip shader program instruction memory without overwriting the first shader program.

31. The device of claim 29, wherein the processor is further configured to overwrite at least a portion of the evicted shader program with at least a portion of the shader program to be loaded into the on-chip shader program instruction memory.

32. A device comprising:

an on-chip shader program instruction memory comprising an instruction cache from which a shader unit fetches instructions during execution of at least one of a plurality of shader programs;

a processor configured to:

cause the plurality of shader programs of a common shader program type to be loaded into the on-chip shader program instruction memory of a graphics processor such that each shader program in the plurality of shader programs resides in the on-chip shader program instruction memory at a common point in time;

load a first shader program of the common shader program type into the on-chip shader program instruction memory;

determine one or more ranges of available memory space in the on-chip shader program instruction memory after the first shader program has been loaded into the on-chip shader program instruction memory;

load a second shader program of the common shader program type into one of the one or more ranges of available memory space;

determine whether the on-chip shader program instruction memory has a sufficient amount of available memory space to store a shader program to be loaded into the on-chip shader program instruction memory;

determine a set of N least frequently used shader programs from a set of one or more shader programs stored within the on-chip shader program instruction memory;

determine a least recently used shader program from the set of N least frequently used shader programs; and evict the least recently used shader program from the on-chip shader program instruction memory, where N is an integer greater than or equal to one in response to determining that the on-chip shader program instruction memory does not have the sufficient amount of available memory space to store the shader program.

33. The device of claim 32, wherein the processor is further configured to load a the second shader program of the common shader program type into the on-chip shader program instruction memory without overwriting the first shader program.

34. The device of claim 32, wherein the processor is further configured to overwrite at least a portion of the evicted shader program with at least a portion of the shader program to be loaded into the on-chip shader program instruction memory.

35. An apparatus comprising:
means for loading a shader program into an on-chip shader program instruction memory of a graphics processor;
means for causing a plurality of shader programs of a common shader program type to be loaded into the on-chip shader program instruction memory of the graphics processor such that each shader program in the plurality of shader programs resides in the on-chip shader program instruction memory at a common point in time;
means for loading a first shader program of the common shader program type into the on-chip shader program instruction memory;
means for determining one or more ranges of available memory space in the on-chip shader program instruction memory after the first shader program has been loaded into the on-chip shader program instruction memory;
means for loading a second shader program of the common shader program type into one of the one or more ranges of available memory space;
means for determining whether the on-chip shader program instruction memory has a sufficient amount of available memory space to store a shader program to be loaded into the on-chip shader program instruction memory;
means for determining a least recently used shader program from a set of one or more shader programs stored within the on-chip shader program instruction memory in response to determining that the on-chip shader program instruction memory does not have the sufficient amount of available memory space to store the shader program; and
means for evicting the least recently used shader program from the on-chip shader program instruction memory in response to determining that the on-chip shader program instruction memory does not have the sufficient amount of available memory space to store the shader program,
wherein the on-chip shader program instruction memory comprises an instruction cache from which a shader unit fetches instructions during execution of at least one of the plurality of shader programs.

36. The apparatus of claim 35, wherein the means for loading a second shader program of the common shader program type into the on-chip shader program instruction memory loads the second shader program without overwriting the first shader program.

37. An apparatus comprising:
means for loading a shader program into an on-chip shader program instruction memory of a graphics processor;
means for causing a plurality of shader programs of a common shader program type to be loaded into the on-chip shader program instruction memory of the graphics processor such that each shader program in the plurality of shader programs resides in the on-chip shader program instruction memory at a common point in time;
means for loading a first shader program of the common shader program type into the on-chip shader program instruction memory;
means for determining one or more ranges of available memory space in the on-chip shader program instruction memory after the first shader program has been loaded into the on-chip shader program instruction memory;
means for loading a second shader program of the common shader program type into one of the one or more ranges of available memory space;
means for determining whether the on-chip shader program instruction memory has a sufficient amount of available memory space to store a shader program to be loaded into the on-chip shader program instruction memory;
means for determining a set of N least frequently used shader programs from a set of one or more shader programs stored within the on-chip shader program instruction memory, where N is an integer greater than or equal to one in response to determining that the on-chip shader program instruction memory does not have the sufficient amount of available memory space to store the shader program;
means for determining a least recently used shader program from the set of N least frequently used shader programs in response to determining that the on-chip shader program instruction memory does not have the sufficient amount of available memory space to store the shader program; and
means for evicting the least recently used shader program from the on-chip shader program instruction memory in response to determining that the on-chip shader program instruction memory does not have the sufficient amount of available memory space to store the shader program,
wherein the on-chip shader program instruction memory comprises an instruction cache from which a shader unit fetches instructions during execution of at least one of the plurality of shader programs.

38. The apparatus of claim 37, wherein the means for loading a second shader program of the common shader program type into the on-chip shader program instruction memory loads the second shader program without overwriting the first shader program.

39. A non-transitory computer-readable storage medium storing instructions that, when executed, cause one or more processors to:
cause a plurality of shader programs of a common shader program type to be loaded into an on-chip shader program instruction memory of a graphics processor such that each shader program in the plurality of shader programs resides in the on-chip shader program instruction memory at a common point in time;
load a first shader program of the common shader program type into the on-chip shader program instruction memory;
determine one or more ranges of available memory space in the on-chip shader program instruction memory after the first shader program has been loaded into the on-chip shader program instruction memory;
load a second shader program of the common shader program type into one of the one or more ranges of available memory space;

determine whether the on-chip shader program instruction memory has a sufficient amount of available memory space to store a shader program to be loaded into the on-chip shader program instruction memory; and in response to determining that the on-chip shader program instruction memory does not have the sufficient amount of available memory space to store the shader program:

determine a least recently used shader program from a set of one or more shader programs stored within the on-chip shader program instruction memory; and evict the least recently used shader program from the on-chip shader program instruction memory, wherein the on-chip shader program instruction memory comprises an instruction cache from which a shader unit fetches instructions during execution of at least one of the plurality of shader programs.

40. The non-transitory computer-readable storage medium of claim 39, wherein the instructions further cause the one or more processors to:

load a second shader program of the common shader program type into the on-chip shader program instruction memory without overwriting the first shader program.

41. A non-transitory computer-readable storage medium storing instructions that, when executed, cause one or more processors to:

cause a plurality of shader programs of a common shader program type to be loaded into an on-chip shader program instruction memory of a graphics processor such that each shader program in the plurality of shader programs resides in the on-chip shader program instruction memory at a common point in time;

load a first shader program of the common shader program type into the on-chip shader program instruction memory;

determine one or more ranges of available memory space in the on-chip shader program instruction memory after the first shader program has been loaded into the on-chip shader program instruction memory;

load a second shader program of the common shader program type into one of the one or more ranges of available memory space;

determine whether the on-chip shader program instruction memory has a sufficient amount of available memory space to store a shader program to be loaded into the on-chip shader program instruction memory; and in response to determining that the on-chip shader program instruction memory does not have the sufficient amount of available memory space to store the shader program:

determine a set of N least frequently used shader programs from a set of one or more shader programs stored within the on-chip shader program instruction memory, where N is an integer greater than or equal to one;

determine a least recently used shader program from the set of N least frequently used shader programs; and evict the least recently used shader program from the on-chip shader program instruction memory, wherein the on-chip shader program instruction memory comprises an instruction cache from which a shader unit fetches instructions during execution of at least one of the plurality of shader programs.

42. The non-transitory computer-readable storage medium of claim 41, wherein the instructions further cause the one or more processors to:

load a second shader program of the common shader program type into the on-chip shader program instruction memory without overwriting the first shader program.

* * * * *